(12) United States Patent
Onodera

(10) Patent No.: US 6,487,069 B1
(45) Date of Patent: Nov. 26, 2002

(54) PORTABLE PERSONAL COMPUTER HAVING A CAMERA MOUNTED THEREON

(75) Inventor: Susumu Onodera, Tokyo (JP)

(73) Assignee: NEC Corporation, Tokyo (JP)

( * ) Notice: Subject to any disclaimer, the term of this patent is extended or adjusted under 35 U.S.C. 154(b) by 25 days.

(21) Appl. No.: 09/634,545

(22) Filed: Aug. 8, 2000

(30) Foreign Application Priority Data

Aug. 10, 1999 (JP) .......................................... 11-226201

(51) Int. Cl.[7] ................................................. G06F 1/16
(52) U.S. Cl. ..................... 361/683; 361/686; 312/223.1; 710/62
(58) Field of Search ................................ 361/679–686; 312/223.1–223.3, 265.6; D14/107, 113, 114; 710/62, 100, 102

(56) References Cited

U.S. PATENT DOCUMENTS

| 5,948,086 A | * | 9/1999 | Lin | .............................. | 710/100 |
| 6,188,569 B1 | * | 2/2001 | Minemoto et al. | .......... | 361/683 |

FOREIGN PATENT DOCUMENTS

| JP | 4-354483 | 12/1992 |
| JP | 5-66726 | 9/1993 |
| JP | 6-274244 | 9/1994 |
| JP | 8-22343 | 1/1996 |
| JP | 8-249086 | 9/1996 |
| JP | 8-339239 | 12/1996 |
| JP | 9-322041 | 12/1997 |
| JP | 10-51665 | 2/1998 |
| JP | 10-124186 | 5/1998 |
| JP | 10-164414 | 6/1998 |
| JP | 11-53060 | 2/1999 |

* cited by examiner

Primary Examiner—Darren Schuberg
Assistant Examiner—Yean-Hsi Chang
(74) Attorney, Agent, or Firm—Sughrue Mion, PLLC

(57) ABSTRACT

A keyboard portion hinders holding a personal computer upon opening and it is difficult to pick up image while the personal computer is held with hands. It is not easy to use since transfer rate of image data to the main body is limited. To eliminate such drawbacks, when moving or still image is picked up by a camera unit 4, keyboard is separated from main body 2 by releasing engagement of the connectors 7a and 7b and operation is conducted by only main body 2. When user depresses shutter button 5, still image of object is picked up by camera unit 4. The picked-up still image data is fed to a hard disk drive in the main body 2 and is stored therein. Pen 6 gives instructions to the computer circuit in the main body 2 from a digitizer included in the display 3. The image data stored in the hard disk drive can be displayed on the display 3 for personal computer by actuating of the pen 6.

8 Claims, 2 Drawing Sheets

PORTABLE PERSONAL COMPUTER HAVING A CAMERA MOUNTED THEREON

FIELD OF THE INVENTION

The present invention relates to a portable personal computer having a camera mounted thereon and in particular to a portable personal computer having a camera mounted thereon as a device for inputting moving or still images thereto.

BACKGROUND OF THE INVENTION

Various portable personal computers on which a camera is mounted as a device for inputting moving and still images thereto have been proposed (refer to, for example, Japanese Patent Kokai Publications JP-A-10-051665, JP-A-10-164414, JP-A-11-053060). A prior art portable personal computer having a camera mounted thereon which is a disclosed in Japanese Patent Kokai Publication JP-A-10-051665 comprises an upper panel which is provided with a display unit for displaying graphical and character images on a screen and a lower panel having an operating unit for entering information thereto. The upper panel is on its part with a mounting recess having a spherical support for pivotally bearing an electronic camera which is at least partly spherical in shape while it is in contact with the spherical surface of the electronic camera.

A prior art portable personal camera having a camera mounted thereon disclosed in Japanese Patent Kokai Publication JP-A-10-164414 comprises a camera having a lens system and a CCD. A deflection mirror is disposed on the side of an object to be photographed with respect to the lens system to form a tube lens unit in such a manner that the incident optical axis intersects with the optical axis of the lens system and CCD. The tube lens unit is held on a display so that it is pivotable around an axis which is parallel to said optical axis of the lens system and the CCD. The pivoting axis of the tube lens unit is disposed perpendicular to a pivoting axis of the display.

A prior art portable personal computer having a camera mounted thereon which is disclosed in Japanese Patent Kokai Publication JP-A-11-053060 has a connector which is exclusively used for the camera. A camera unit can be directly detachably connected to the connector without any cable and can be connected to the connector via a cable.

SUMMARY OF THE DISCLOSURE

In the prior art portable personal computer having a camera mounted thereon which is disclosed in the above-mentioned Japanese Patent Kokai Publication JP-A-10-051665, it is easy to adjust the camera in an image pickup direction whereas it is hard to carry due to the fact that the keyboard portion will hinder the carrying while the Keyboard is opened and it is hard to take a picture while holding the personal computer with both hands.

In the prior art portable personal computer having a camera mounted thereon which is disclosed in the above-mentioned Japanese Patent Kokai Publication JP-A-10-164414, the photographing of the camera in a lateral direction can be adjusted only by pivoting a camera without moving the entire of the computer since the tube lens unit can be pivoted about an axis perpendicular to the pivoting axis of the display. This computer is also hard to carry since the keyboard will hinder the carrying while the keyboard is opened and is hard to take a picture while the computer is held with both hands.

In the prior art portable personal computer having a camera mounted thereon which is disclosed in the above-identified Japanese Patent Kokai Publication JP-A-11-053060, only the camera is detached from the computer main body and is connected with the personal computer via a cable, so that only the camera can be operated even if the keyboard is opened. However, the transfer rate of image data from the camera to the personal computer is restricted, so that it is not convenient to use the camera.

The present invention has been achieved to overcome the above-mentioned problems.

It is an object of the present invention to provide a portable personal computer having a camera mounted thereon, which is easy to operate the camera and is capable of shooting a stable image while maintaining easy operation of the keyboard.

It is another object of the present invention to provide a portable personal computer having a camera mounted thereon in which the transfer rate of the image data is not restricted.

It is a further object of the present invention to provide a portable personal computer having a camera mounted thereon in which its portability can be enhanced.

It is a further object of the present invention to provide a portable personal computer having a camera mounted thereon which can make the shot image more visible.

According to a first aspect of the present invention, there is provided a portable personal computer having a camera mounted thereon, in which the computer comprises a keyboard including various keys, which is provided with a first connection at a predetermined position; a display displaying images; a camera unit shooting image of a desired object; a shutter button operatively associated with the camera unit for operating same. The display, camera unit and shutter button are provided integrally with a housing which accommodates therein a computer circuit including a storage device, to constitute a main body having, externally of the housing, a second connection which is detachably connectable with the first connection. Image data which is obtained by image shooting by the camera unit is stored in the storage device in the computer circuit.

Since the main body which is provided with the camera unit and the shutter button can be separated from the keyboard in accordance with the present aspect, image picking up can be conducted by using only the camera unit on the main body and the obtained image data can be stored in the storage device in the main body.

According to a second aspect of the present invention, there is further provided a portable personal computer having a camera mounted thereon, characterized in that the computer comprises: a keyboard including various keys, which is provided with a first connection at a predetermined position; a display displaying images; a camera unit for picking up image of a desired object; a shutter button which is operatively associated with the camera unit for operating same; a computer unit having therein a computer circuit including a storage device; and a detachable cable which connects the keyboard with the computer unit. The display, camera unit and shutter button constitute a display unit which is fixed at a desired angle to the computer by a hinge. Image data which is obtained by image picking up with the aid of the camera unit is stored in the storage device in the computer circuit. In the present aspect, the angle between the display unit and the computer unit can be selected and set at a desired angle by means of the hinge.

According to a third aspect of the present invention, the display includes a digitizer, wherein an instruction is provided to the computer circuit from a pointing device via the digitizer of the display when the keyboard is separated from the main body.

PREFERRED EMBODIMENTS OF THE INVENTION

Figure 1:
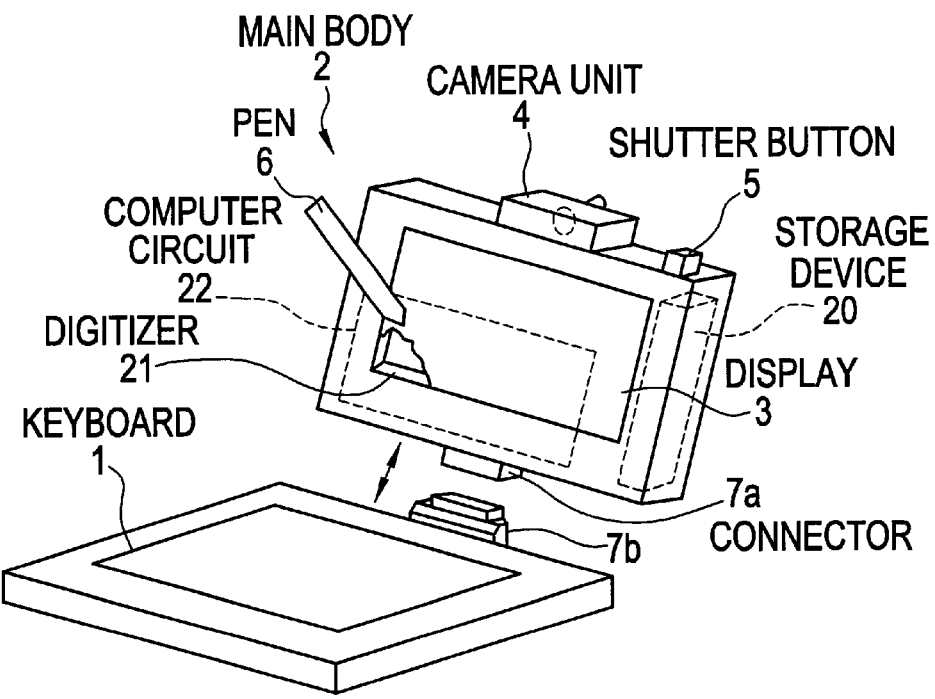
FIG. 1 A schematic perspective view showing one embodiment of the present invention.

Now, a mode of embodying the present invention will be described with reference to the drawings. FIG. 1 is a schematic perspective view showing an embodiment of a portable personal computer having a camera mounted thereon. The portable personal computer of this embodiment is commonly referred to as "notebook personal computer" and comprises a keyboard 1 and a main body 2 and is compact in size and light weight and excellent in portability.

The main body 2 incorporates in its housing a computer circuit 22 comprising a central processing unit (CPU), (not shown) memory, (not shown) graphic circuit (not shown) and hard disk drive (storage device) 20. The main body 2 is provided externally of the housing a display 3, a camera unit 4, shutter button 5 and a main body slide connector 7a. The keyboard 1 is separated from the main body 2 and is provided with various keys on its upper side and is provided with a keyboard side connector 7b in a position corresponding to the main body side connector 7a which is provided at a substantially central position at the rear end of the main body. Mating (engagement) between the connectors 7a and 7b causes mechanical and electrical connection between the keyboard 1 and the main body 2.

In order to achieve a tilting function of the main body 2, the connector 7b preferably comprises a hinge mechanism. Only connector may be provided by providing the main body 2 on its rear side with a support column for supporting the main body 2. The keyboard 1 may be connected to the main body 2 via a cable which is detachable to the connectors. The display 3 includes a digitizer, 21 so that a pointing operation can be performed with a pen 6 which is one type of pointing device. Electromagnetic induction type digitizer is preferable since it requires no cable and causes less deterioration of the image. However, the other types of digitizers such as a resistor film type digitizer may also be used.

The camera unit 4 is mounted on the main body 2 at a substantially central position at the upper end thereof. In FIG. 1, a lens system is directed toward a side opposite to the display 3. Accordingly, a view finder is disposed in such a manner that it is disposed on the side in which the display 3 is provided. The lens and view finder may be provided in a manner opposite to that shown in FIG. 1. The camera unit 4 is adapted to operate in response to an operation of the shutter button 5 disposed in the vicinity of the camera unit 4. This resembles the personal computer to optical cameras or video cameras in configuration, for enabling users to conduct an intuitive camera operation.

Now, operation of this embodiment will be described. When the keyboard 1 is electrically and mechanically connected with the main body 2 by an engagement between the connectors 7a and 7b, applications such as word processing, browsing and e-mailing software can be executed similarly to common notebook personal computers. When a moving or still image is picked up by means of the camera unit 4 in the personal computer of this embodiment which performs an operation similar to the general notebook personal computer, operation is conducted only by the main body 2 by releasing the engagement between the connectors 7a and 7b to separate the keyboard 1 from the main body 2. On shooting the image, grasping the opposite sides of the main body 2 with user's hands is preferred since it stabilizes the image shooting position and posture of the camera unit 4.

When the user depresses the shutter button 5 on shooting a still image, the still image of an object is picked up by the camera unit 4. The still image data which has been generated by the camera unit 4 is directly fed to a hard disk drive 20 incorporated in the main body 2 without being fed via cable, so that it is stored therein. While the user depresses the shutter button 5 in order to shoot a moving image, the images of the object which changes with time are picked up by the camera unit 4 and converted into the image data and thereafter they are fed to a hard disk drive 20 incorporated in the main body 2 and is stored therein. Image recording may be initiated by single depression of the shutter button 5 and may be terminated by one or more depression of the shutter button 5.

The pen 6 gives necessary instructions to the computer circuit in the main body 2 through a digitizer 21 which is provided in the display 3. When the keyboard 1 is connected to the main body 2, the operation of the personal computer is enabled from either the keyboard 1 or pen 6. When the keyboard 1 is separated from the main body 2, the operation of the computer is conducted with the aid of only pen 6. Actuation of the pen 6 enables the image data stored in said hard disk drive to be displayed on the display 3 for the personal computer.

Since the keyboard 1 is separated from the main body 2 so that only main body 2 is operated on image shooting by the camera unit 4 in this embodiment, the operation of the camera unit 4 is easy. Since the shape of the main body 2 resembles that of the conventional camera, users can intuitively operate the camera unit 4 and a stable image can be picked up. Portability can be enhanced since separation between the main body 2 and the keyboard 1 enables the user to separately hold them. Since the image which is picked up by the camera unit 4 can be displayed on a large screen of the display of the personal computer, which is integrated with the camera unit 4. The picked up image can be visible in an easy manner.

Since the image data which has been generated in the camera unit is directly fed to the hard disk drive 20 which is incorporated in the main body 2 without being fed through cable and is stored therein in the present embodiment, on transferring the data, it is not necessary to conduct data compression which should otherwise be conducted due to the restriction of the data transfer rate so that the image data can be stored in the hard disk drive 20 without causing any deterioration of the image.

Figure 2:
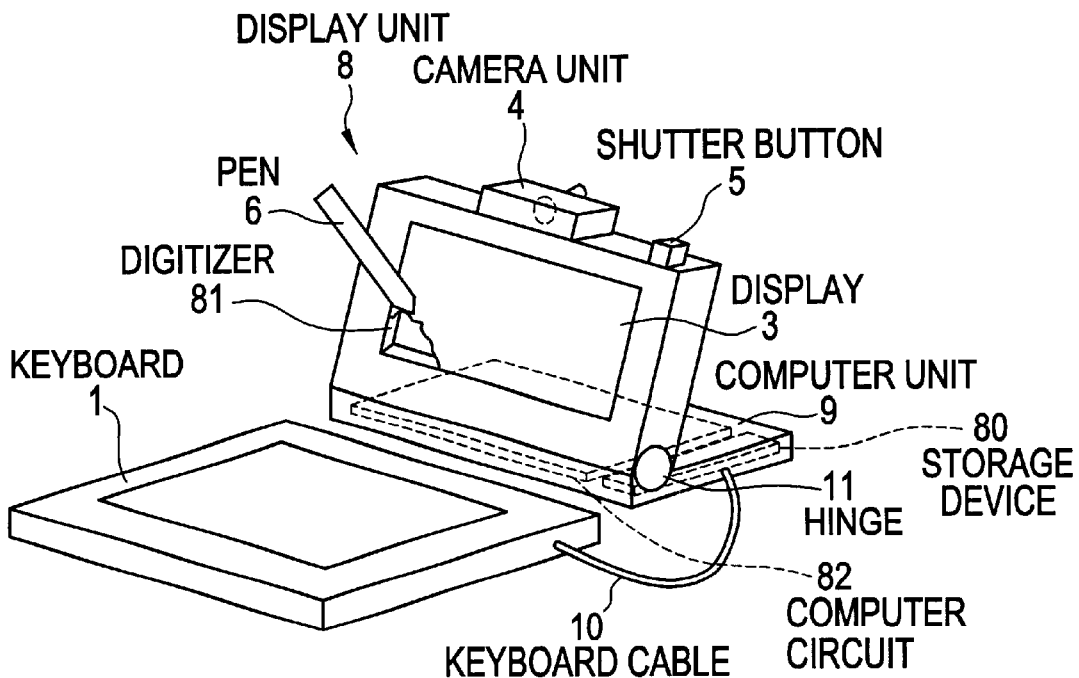
FIG. 2 A schematic perspective view showing another embodiment of the present invention.
Figure 3:
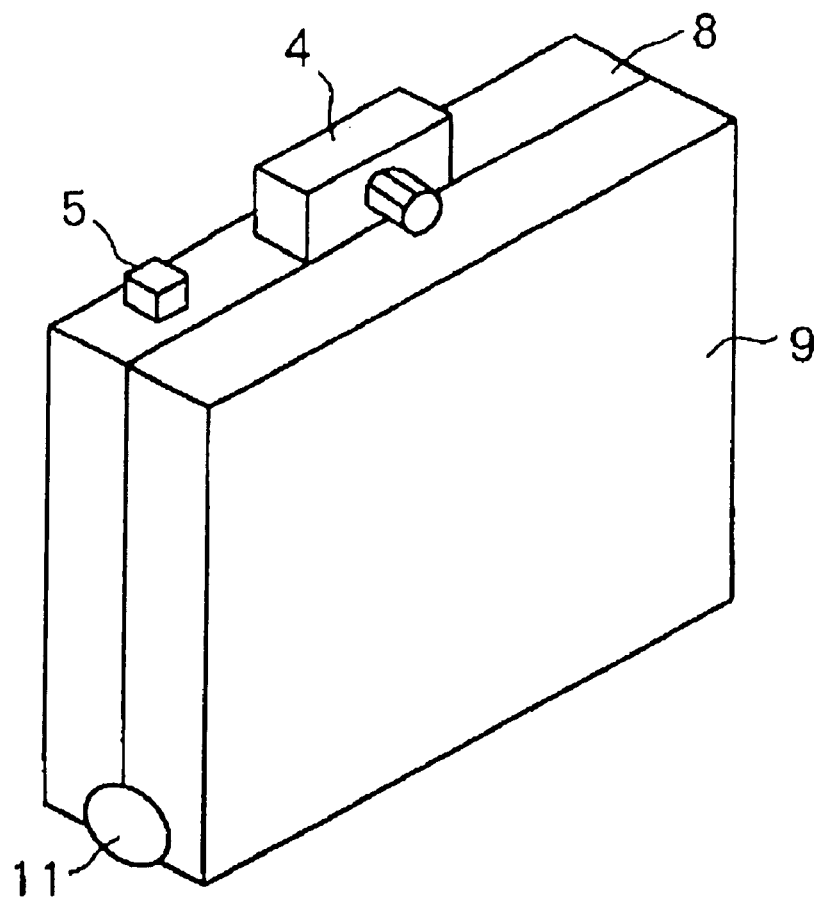
FIG. 3 A perspective view showing the personal computer in FIG. 2 in which the computer unit abut to the display unit.

Now, another embodiment of the present invention will be described. FIG. 2 is a schematic perspective view showing another embodiment of the portable personal computer having a camera mounted thereon of the present invention. FIG. 3 is a schematic perspective view showing the embodiment in FIG. 2 when the display unit and computer unit are closed and folded each other. In the drawings, like structural parts are designated with like reference numerals.

As shown in FIG. 2, this embodiment comprises a keyboard 1, display unit 8 and a computer unit 9. The display unit 8 comprises a display 3, camera unit 4 and shutter button 5. The camera unit 4 is provided in the substantially central position at the upper end. The shutter button 5 is provided laterally of the camera unit 4. This display 3 is equipped with a digitizer 81 similarly to the embodiment in FIG. 1, so that computer operation is enabled with the aid of pen 6.

The computer unit 9 has in its rectangular parallelepiped housing a computer circuit 82 including a CPU (not shown) memory, (not shown) graphic circuit (not shown) and hard disk drive (storage device) 80 and is electrically and mechanically connected to the display unit 8 through a hinge 11 in such a manner that it is pivotable around the hinge. The keyboard 1 is provided with various keys similarly to the keyboard 1 in the embodiment of FIG. 1 and is connected to the computer unit 9 via a keyboard cable 10 unlike the embodiment in FIG. 1. Preferably, the keyboard 10 is detachably connectable thereto with the aid of a connector.

The operation of this embodiment will now be described. When a moving image or still image is picked up by using the camera unit 4 in a personal computer of this embodiment which performs the operation similar to that of the common notebook personal computer under a condition in which it is connected as shown in FIG. 2, the display unit 8 and the computer unit 9 are pivoted about the hinge 11 so that they are folded to abut to each other as shown in FIG. 3.

Image picking up is conducted by depressing the shutter button 5 while a user holds the right and left sides of the display unit 8 and computer unit 9 with his or her hands and the lens of the camera unit 4 views toward the object and the image data is stored in the hard disk drive 80 within the computer unit 9. A necessary instruction is given to the circuitry in the computer unit 9 from the digitizer 81 included in the display 3 by means of the pen 6 similarly to the embodiment in FIG. 1. For example, the image data which is stored in said hard disk drive can be displayed on the display 3 for the personal computer.

The present embodiment provides an advantage which is similar to that of the embodiment in FIG. 1, as well as an advantage in that the display unit 8 is placed and retained in a stable state when the personal computer is used on the desk. The reason resides in that there is provided with the hinge 11 which is capable of fixing (setting) the angle between the display unit 8 and the computer unit 9. Since the personal computer is configured in such a manner that the keyboard 1 is connected with the computer unit 9 through the keyboard cable 10, an advantage in that the freedom degree of the personal computer operation can be enhanced can also be obtained. The reason resides in that the keyboard 1 can be freely disposed in a desired position and posture.

It is to be noted that the present invention is not limited to the above-mentioned embodiments. Although it has been described that the camera unit 4 is fixed to the housing of the main body 2 or the housing of the display unit 8, the camera unit may be arranged so that it is pivoted on the housing by a known pivoting mechanism. In this case, it is possible to desiredly adjust the image shooting direction and to pick up the image of the photographer himself or herself. The present invention is also applicable to PDA (personal digital assistance) and the like.

The meritorious effects of the present invention are summarized as follows.

As mentioned above, in accordance with the present invention, the main body which is provided with the camera unit and the shutter button can be separated from the keyboard, so that image shooting can be conducted by using only the camera unit on the main body. Accordingly, operation of the camera unit is easy and the image can be picked up in a stable manner. The user can intuitibly operate the camera unit.

A compression operation is required due to the restriction of the transfer rate in the prior art system which transmits the image data via a cable. In contrast to this, no compression operation is necessary since the image data which is obtained from the camera unit can be directly stored in the storage device in the main body on which the camera unit is mounted in accordance with the present invention. Therefore, the image data can be fed to the storage device from the camera unit without being deteriorated.

Since the keyboard can be separated from the main body in accordance with the present invention, the portability of the main body including the camera unit can be enhanced. Since the display is integral with the camera unit and the display having a large screen for the personal computer can be used for the display of the picked up image data in accordance with the present invention, the picked up image can be more visible than the prior art.

Since the angle between the display unit and the computer unit can be fixed at a desired value by the hinge in accordance with the present invention, the display unit can be placed in a stable manner when the personal computer is used on the desk.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A portable personal computer having a camera mounted thereon, said computer comprising:
   a keyboard including various keys, which is provided with a first connection at a predetermined position;
   a display for displaying images;
   a camera unit for shooting an image of a desired object;
   a shutter button operatively associated with said camera unit for operating said camera;
   wherein said display, camera unit and shutter button are provided integrally with a housing which accommodates therein a computer circuit including a storage device, to constitute a main body having, externally of said housing, a second connection which is detachably connectable with said first connection,
   wherein said shutter button is provided on an external portion of said housing, separate from said camera unit and said display,
   wherein said main body does not include said keyboard, and
   wherein image data obtained by image-shooting by said camera unit is stored in said storage device in said computer.

2. A portable personal computer having a camera mounted thereon as defined in claim 1, wherein said first and second connections comprise first and second connectors, respectively, and wherein said keyboard is electrically and mechanically connected with said main body by mating of said first and second connectors.

3. A portable personal computer having a camera mounted thereon as defined in claim 1, wherein said first and second connections comprise first and second connectors which are detachably attachable each other via a cable, respectively, and wherein said keyboard is electrically and mechanically connected with said main body by connecting said first and second connectors via said cable.

4. A portable personal computer having a camera mounted thereon as defined in claim 1, wherein said display includes a digitizer, and wherein an instruction is provided to said computer circuit from a pointing device via said digitizer of said display when said keyboard is separated from said main body.

5. A portable personal computer having a camera mounted thereon, said computer comprising:

- a keyboard including various keys, which is provided with a first connection at a predetermined position;
- a display for displaying images;
- a camera unit for shooting an image of a desired object;
- a shutter button operatively associated with said camera unit for operating same;
- a computer unit having therein a computer circuit including a storage device; and
- a detachable cable which connects said keyboard with said computer unit;
- wherein said display, camera unit and shutter button constitute a display unit which is fixed at a desired angle with respect to said computer unit through a hinge,
- wherein said shutter button is provided on an external portion of said display unit, separate from said camera unit and said display,
- wherein said display unit does not include said keyboard, and
- wherein image data which is obtained by image-shooting by said camera unit is stored in said storage device in said computer circuit.

6. A portable personal computer having a camera mounted thereon as defined in claim 5, wherein said camera unit is used under a condition in which said computer unit is separated from said cable and is folded to meet said display unit by means of said hinge so that the angle between said display unit and said computer unit is closed.

7. A portable personal computer having a camera mounted thereon as defined in claim 5, wherein said display comprises a digitizer; and wherein an instruction is provided to said computer circuit from a pointing device via said digitizer of said display when said keyboard is separated from said main body.

8. A portable personal computer having a camera mounted thereon, said computer comprising:

- a keyboard including various keys, which is provided with a first connection at a predetermined position;
- a display displaying images;
- a camera unit shooting image of a desired object;
- a shutter button operatively associated with said camera unit for operating same;
- a computer unit having therein a computer circuit including a storage device; and
- a detachable cable which connects said keyboard with said computer unit;
- wherein said display, camera unit and shutter button constitute a display unit which is fixed at a desired angle with respect to said computer unit through a hinge,
- wherein image data which is obtained by image-shooting by said camera unit is stored in said storage device in said computer circuit, and
- wherein said camera unit is used under a condition in which said computer unit is separated from said cable and is folded to meet said display unit by means of said hinge so that the angle between said display unit and said computer unit is closed.

* * * * *